(12) United States Patent
Stapf

(10) Patent No.: US 11,573,568 B2
(45) Date of Patent: Feb. 7, 2023

(54) FUNCTION-ORIENTED ELECTRONICS ARCHITECTURE

(71) Applicant: Dr. Ing. h.c. F. Porsche Aktiengesellschaft, Stuttgart (DE)

(72) Inventor: Daniel Stapf, Wangen im Allgaeu (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 227 days.

(21) Appl. No.: 17/102,571

(22) Filed: Nov. 24, 2020

(65) Prior Publication Data
US 2021/0165407 A1 Jun. 3, 2021

(30) Foreign Application Priority Data
Nov. 29, 2019 (DE) ...................... 10 2019 132 428.9

(51) Int. Cl.
*G05D 1/00* (2006.01)
*G01M 17/007* (2006.01)
(52) U.S. Cl.
CPC ........ *G05D 1/0072* (2013.01); *G01M 17/007* (2013.01)
(58) Field of Classification Search
CPC .......................... G05D 1/0072; G01M 17/007; B60W 50/035; G06F 11/0739; G06F 11/0751; G06F 11/0769; G06F 11/0772; G06F 11/0793; G06F 15/161; G06F 15/173; G05B 19/0428; B60R 116/0232; H04L 12/40; H04L 2012/40215; H04L 2012/40241
See application file for complete search history.

(56) References Cited

U.S. PATENT DOCUMENTS 5,508,689 A * 4/1996 Rado ................... B60R 16/0315
340/3.1
7,058,485 B2 6/2006 Thomas et al.

FOREIGN PATENT DOCUMENTS

DE 10052570 A1 4/2002
DE 102017201702 A1 8/2018
WO WO-2017054816 A1 * 4/2017 ......... F16H 61/0006

* cited by examiner

*Primary Examiner* — Marthe Y Marc-Coleman
(74) *Attorney, Agent, or Firm* — Leydig, Voit & Mayer, Ltd.

(57) ABSTRACT

A control device for an electromechanical system includes at least one group of actuators, of which in each case one actuator is configured to be coupled to a mechanical and/or hydraulic unit and is configured to control an operation of the mechanical and/or hydraulic unit. The control device further includes at least one group of functional modules, which are implemented on at least one computing platform. The at least one group of functional modules includes a plurality of control modules, each respective control module being respectively assigned to and coupled in a communicative manner to a respective actuator, and a coordinating module communicatively coupled to the plurality of control modules. The coordinating module is designed to receive, from each respective control module of the plurality of control modules, fault messages with respect to an operating state of the associated mechanical and/or hydraulic unit and/or the associated actuator.

11 Claims, 3 Drawing Sheets

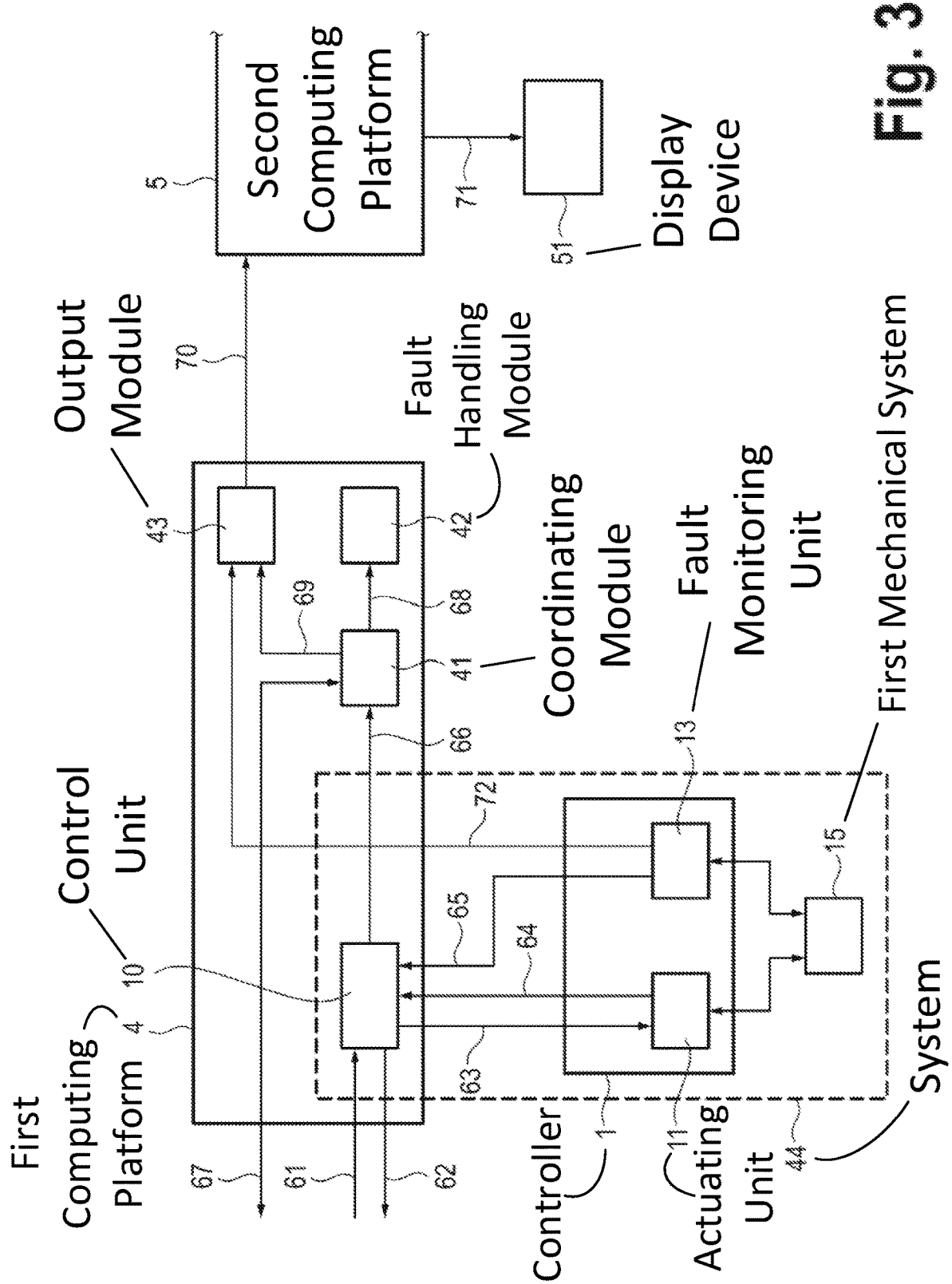

FUNCTION-ORIENTED ELECTRONICS ARCHITECTURE

CROSS-REFERENCE TO PRIOR APPLICATIONS

Priority is claimed to German Patent Application No. DE 10 2019 132 428.9, filed on Nov. 29, 2019, the entire disclosure of which is hereby incorporated by reference herein.

FIELD

The present invention relates to a function-oriented electronics architecture, and in particular, to a function-oriented electronics architecture for a vehicle.

BACKGROUND

The electrical-electronic architecture (E/E) is the internal intermeshing between electrical and electronic components in a motor vehicle which, considered in general, is intended in its interaction to provide optimum energy management. This combines the functions of storing energy, supplying energy and recovering energy. The E/E systems are used both in gasoline-operated motor vehicles and in electric vehicles. They are for example also responsible for supplying to and controlling the driver assistance and driving safety systems (for example ESP) and also the components of the infotainment system with the corresponding electronic controllers.

In the architectures commonly encountered today, the functionalities are located on the respective controllers. That is to say that each terminal, for example an electronic, electromechanical or mechanical component, is activated by an associated controller, so that the functional scope of the terminal is ultimately determined by the controller. By this configuration of the architecture, the variance of the vehicle/drive and the fault management are implemented on the respective controllers. Within this architecture, each controller sends specific items of information (for example engine speed, drive position, gear engaged) but also specific warning/alerting messages (for example a red or yellow warning symbol) over the on-board communications network (for example FlexRay or CAN). These items of information are sent to the instrument cluster and can be displayed there. As of today, 62 messages and 110 signals are defined just for warning/alerting messages.

An increasingly onerous disadvantage of this architecture is that each controller must have knowledge of the vehicle configuration, in order for example in the event of detection of a failure of a function to request alternative measures. This replication of the vehicle variance at the controller level is not only laborious and complicated, it also leads to a relatively rigid architecture with regard to updateability and expandability. Moreover, in principle each controller is capable of bringing about a fault indication on the instrument cluster, if it is predefined as such in the associated controller. It can consequently happen that for example a function of the electromechanical system is indicated as faulty or defective although it can possibly be provided by other components in the electromechanical system by means of alternative measures. Furthermore, the constantly growing number of sensor and actuator units in modern vehicles also presents this approach with ever greater problems.

SUMMARY

In an embodiment, the present invention provides a control device for an electromechanical system. The control device includes at least one group of actuators, of which in each case one actuator is configured to be coupled to a mechanical and/or hydraulic unit and is configured to control an operation of the mechanical and/or hydraulic unit. The control device further includes at least one group of functional modules, which are implemented on at least one computing platform. The at least one group of functional modules includes a plurality of control modules, each respective control module being respectively assigned to and coupled in a communicative manner to a respective actuator, and a coordinating module communicatively coupled to the plurality of control modules. The coordinating module is designed to receive, from each respective control module of the plurality of control modules, fault messages with respect to an operating state of the associated mechanical and/or hydraulic unit and/or the associated actuator. The coordinating module is further designed to establish a malfunction based on the fault messages received, and in response, counteract the malfunction established by a countermeasure in the form of a modification of the operation of at least one of the actuators from the at least one group.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 3 shows a further construction given by way of example of the architecture according to the present disclosure.

DETAILED DESCRIPTION

Figure 1:
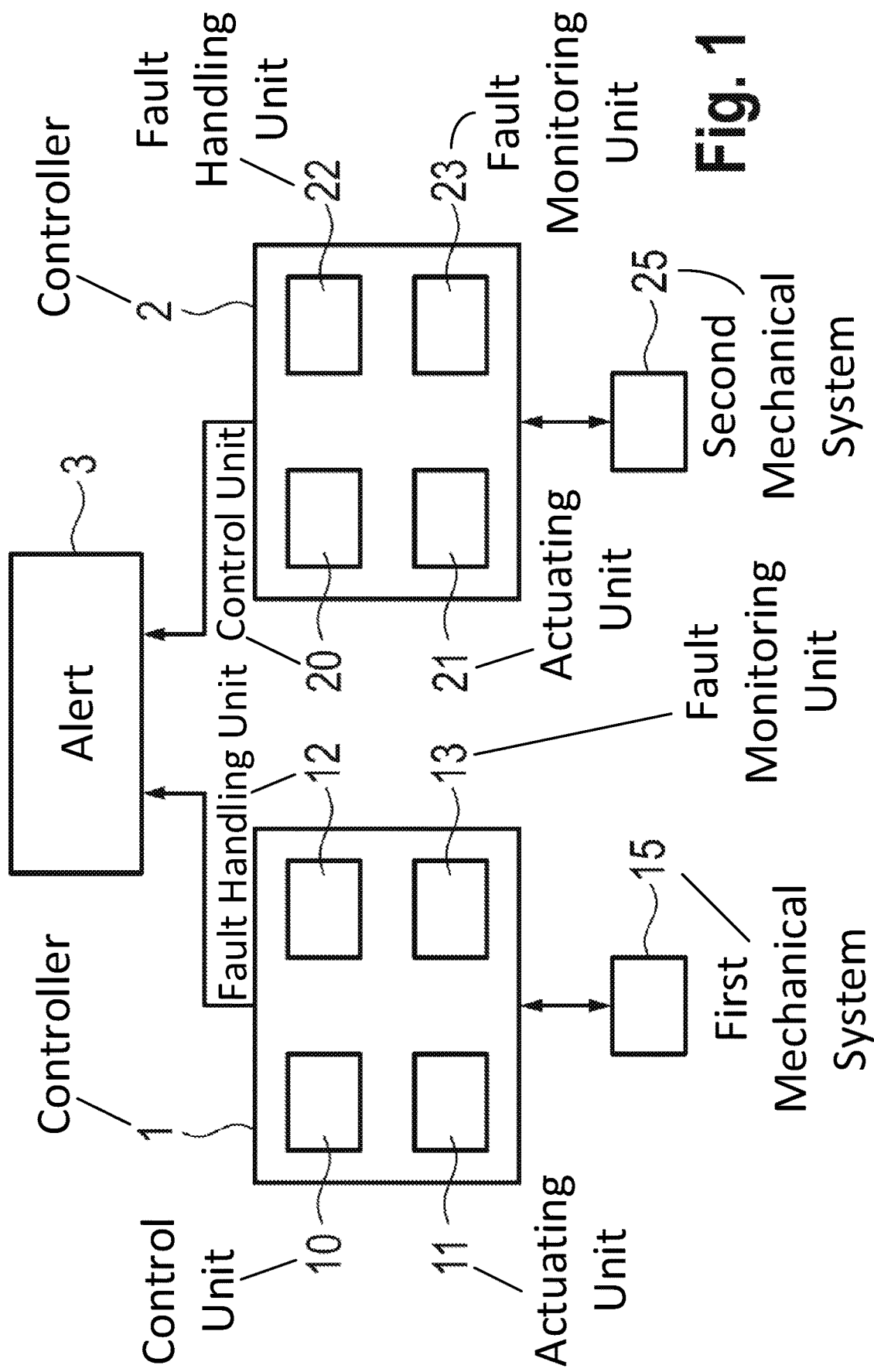
FIG. 1 shows a construction given by way of example of an E/E architecture.

The present disclosure provides an improved architecture, in particular for a vehicle, that overcomes the aforementioned disadvantages.

In particular, the present disclosure provides a control device for an electromechanical system and a corresponding control method.

A control device for an electromechanical system is provided, with at least one group of actuators, of which in each case one actuator can be coupled to a mechanical, electromechanical or electronic unit (or else, according to further embodiments, is also actually coupled) and is designed to control the operation of this mechanical unit. Within the scope of this description, an actuator may have a controller, which however does not have an open-loop/closed-loop controlling module as is the case with classical controllers, but is designed for receiving control commands from an external entity. The actuator or the controller of the control device may for example essentially have an actuating unit and a fault monitoring unit. The actuator of the control device may for example correspond to a smart actuator, which is characterized in that it is capable of detecting some faults of the mechanical or electromechanical unit activated by it and responding independently to them, for example by initiating an immediate measure that can prevent further damage to the activated and in this case fault-affected mechanical unit. This is the case in particular with time-critical and/or serious faults. As a result, the smart actuator can ensure functional safety. The at least one group of actuators may also comprise sensors.

The control device also has at least one group of functional modules, which are implemented on a computing platform, for example on an HCP (high-performance computing platform). The group of functional modules may be assigned to the group of actuators in the sense that the group of functional modules controls the functions of the associated actuators in a defined manner. The group of functional modules firstly comprises a plurality of control modules, a control module being respectively assigned to an actuator and coupled to it in a communicative manner. A control module may be designed for example as a PLC (programmable logic controller). The group of functional modules also comprises a coordinating module, which is communicatively coupled to the plurality of control modules from the same group of functional modules. The coordinating module is designed i) to receive from each control module fault messages with respect to the operating state of the associated mechanical unit and/or the associated actuator; and ii) to establish a malfunction (of the electromechanical system) on the basis of the fault messages received and in response to counteract the malfunction established by a countermeasure in the form of a modification of the operation of at least one of the actuators from the group. Since the coordinating module is notified by the control modules of fault states of the actuators from the at least one group, when there is an established malfunction the countermeasure may be taken while taking into account the current overall state of the part of the electromechanical system that has the group of actuators. Thus, an optimum compensatory measure can then be initiated.

With regard to the interaction between the actuator and the control module, it may be provided in particular that an actuator is designed to adapt a state parameter of the mechanical unit on the basis of a signal obtained from the corresponding control module and each control module is designed to transmit a setpoint value to the corresponding actuator and to obtain an actual value from the corresponding actuator.

According to further embodiments of the control device, the coordinating module may also be designed to output a fault information signal in dependence on the malfunction established and/or the countermeasure taken. Advantageously, the coordinating module represents a central collecting point with regard to the functional restrictions existing in the associated group of actuators and possibly the associated group of functional modules. The output of the fault information signal may be preceded by a prior test of whether the malfunction established can be compensated by means of an alternative measure. It may thus happen that the classification of the degree or severity of a malfunction according to a fault message of a control module turns out to be greater/more serious than the classification of the degree or severity of this malfunction from the viewpoint of the coordinating module, because the coordinating module has all of the relevant information concerning the state of the electromechanical system and may possibly be capable of compensating for the malfunction by a countermeasure.

According to further embodiments, the control device may also have an output device, which is activated by a control module of a second group of functional modules. The second group of functional modules may be constructed in a way analogous to the first group of functional modules. In particular, the second group of functional modules may be implemented on a further computing platform, for example on a second HCP. In the case of a vehicle, the output device may be an instrument cluster.

According to further embodiments of the control device, the at least one group of functional modules may be communicatively coupled to the second group of functional modules. In other words, this means that there is a communicative connection between the computing platform on which the at least one group of functional modules is implemented and the further computing platform on which the second group of functional modules is implemented. The corresponding communication bus used for this may be different from the communication bus by way of which the communication between control modules and the associated actuators is handled. In the latter case, usually FlexRay or CAN is used, whereas Ethernet can advantageously be used for the data connection of the computing platforms.

According to further embodiments of the control device, the control module that activates the output device may be designed to output an item of fault information on the basis of the fault information signal by means of the output device. The fault information may be used in order to inform the user of the electromechanical system about its functional restrictions and/or to bring about a servicing measure. Since the fault information signal is formed on the basis of an overall consideration of the electromechanical system, in particular on the basis of fault messages that are transmitted by control modules, it can inform the user (for example the driver of a vehicle) about which function(s) is (are) actually not available in the electromechanical system, since the fault of the component that provides this function (these functions) cannot be compensated by means of alternative measures or countermeasures that could be initiated by the coordinating module.

According to further embodiments of the control device, each actuator may have a fault monitoring unit, which is designed to transmit a corresponding fault signal to the associated control module when there is an operating error (fault) of the mechanical unit. The transmission of the fault signal has the effect that the control module is provided with an item of information about functional restrictions of the associated mechanical system or the associated actuator. For the transmission of the fault signal from the actuator to the associated control module, the fieldbus existing between these units may be used (for example by using the CAN or FlexRay protocol).

According to further embodiments, the control device may also have a diagnosis event module, which is communicatively coupled to the coordinating module and has a fault memory, and a function suppression module, which is communicatively coupled to the coordinating module and is designed to prevent the performance of certain functions of the electromechanical system in dependence on the current state of the electromechanical system. In the case of a vehicle, the diagnosis event module may be the DEM (diagnostic error manager) and the function suppression module may be the FIM (function inhibition manager), which represent basic software modules of the AUTOSAR reference architecture for controller software in the automobile industry. Both the diagnosis event module and the function suppression module are activated by the coordinating module, so that the documentation of all relevant items of information with respect to malfunctions of the electromechanical system takes place at a central point and not, as in the case of the previously known controller-oriented E/E architecture individually within each controller itself.

According to further embodiments of the control device, the at least one group of functional modules may also have an output module, which is communicatively coupled to the coordinating module and is designed to receive the fault information signal and perform a prioritization and/or coordination with regard to the items of information to be output on the basis of the fault information signal. The output module may be designed to receive in addition to the received fault information signal further signals and to process them jointly and to output an output signal that is standard from the viewpoint of the first group of functional modules and is transmitted by means of the fieldbus to the second group of functional modules. The output signal may in turn be used within the second group of functional modules to output by means of the output device a corresponding item of information, in particular a warning alert, about the operating state of the electromechanical system. The output module may be used generally for designing the display.

According to further embodiments of the control device, the electromechanical system may be a platform for constructing an automobile. In this case, the first group of actuators and the first group of functional modules may be designed for monitoring and controlling the chassis and the power train. Altogether, the platform may have a number of computing platforms (in particular HCPs), a respective group of functional modules, which together with the associated group of actuators or terminals are responsible for other functional areas of the vehicle, being implemented on each computing platform. Thus, for example, a further group of control modules and actuators may be responsible for the man-machine interfaces in the passenger compartment and colorful services. Yet another group of control modules and actuators may be responsible for the processes in the energy and charging area and gray services. Generally, each group of control modules may be implemented on a computing platform of its own, a broadband data connection being provided between the computing platforms.

In the context of an automobile platform, the coordinating module within the first group of control modules may be a PTR manager (power train reduction manager), which collects all of the functional restrictions of the components of the actuator/sensor level of the associated group and, as already mentioned, makes decisions on alternative measures and possibly resultant items of information to be displayed. On account of being located in the group of functional modules that is superordinate to the group of actuators, all relevant items of information concerning the entire vehicle are available to the PTR manager. All of the decisions are documented by a preferably provided interface with respect to the DEM and/or FIM. The output module, which may be referred to as the PTUI (power train user interface), bundles the display wishes of the power train that are generated within the first group of functional modules and prioritizes and coordinates them. The communication between the output module and the output device, which corresponds to a communication between two different computing platforms on which a group of different functional modules is respectively implemented, may take place by way of a fieldbus (for example Ethernet).

The control device described here may be used for constructing a further development of the previously known E/E architecture, which meets the stipulations for a new architecture, the $E^3$ architecture (end-to-end electronics). In the case of the control device according to the disclosure, a new functional level is created in comparison with the previously known E/E architecture, a level which has the at least one group of functional modules, each group of control modules being implemented on a computing platform, in particular an HCP. Altogether, three, four, five or more computing platforms may be provided for example, in order to control the overall operation of the electromechanical system. What is new in relation to the previously known E/E architecture is that the functions usually located on controllers are relocated to the computing platforms and performed there. In the case of the drive as a subsystem of the vehicle to be activated, the usual controllers can to the greatest extent be replaced by smart actuators. The operation of each smart actuator then takes place by performing instructions on the basis of a stipulation made by the associated control module that is implemented on the computing platform and in particular is not a component part of the smart actuator. Time-critical functionalities, for instance the switching sequence of a multispeed dual-clutch transmission, or else time-critical monitoring functions to comply with functional safety requirements to the standard of ISO 26262 can remain as before on the controllers or smart actuators.

According to the $E^3$ architecture, it is intended to avoid direct communication between the controllers, for example between the transmission and the engine. Instead, it is intended that this communication should be carried out centrally by way of the computing platform. The background to this includes that relevant restrictions of the overall vehicle for which there is no information available at controller level, with an effect for example on a switching sequence, may be directly taken into account and limited (capped).

The control device makes it possible to port the fault handling from the controllers or, more generally speaking, from the controller level to the newly created computationally powerful functional level, and thus to achieve the maximum availability of the power train. In order to make the variant management (variant handling) manageable, a clear system context may preferably be drawn. The system context of a mechanical system to be controlled essentially consists of the control module, the actuator or controller of the sensor-actuator level and the mechanical system to be actuated. This generic system context makes it possible to introduce a central fault management of the power train through the coordinating module, in this case the PTR manager. Furthermore, the management of the entire displays of the power train may also preferably take place centrally, for example by the PTUI module arranged downstream of the PTR manager.

For better illustration of the functional principle, and in particular the difference of the control device from the prior art, a comparison with a human organism may be made. Here, the two halves of a brain are taken to correspond by way of example to two computing platforms, or two groups of control modules (the number of which may be greater according to requirements). Hands, which correspond to the (smart) actuator or the controller, are for example actuated. The individual fingers of the hands then correspond to mechanical units. Let us then consider as an example of a fault case the loss of a thumb. In such a fault case, it is not our hand (corresponding to the smart actuator) that decides how a planned operation can alternatively be carried out, for instance the sticking of a thumbtack into a pin board. Rather, the decision on with which measure the problem can be solved takes place situation-dependently in the corresponding half of the brain, possibly involving communication with the other half of the brain. For example, it may be decided that the planned operation can nevertheless be carried out by using the other hand, if there are no "fault messages" relating to it. The severity of the injury or the fault is also processed in the brain and the "message" displayed as to whether for instance a direct hospital visit is required, which in the case of a vehicle corresponds to a trip to a workshop.

In principle, with the present control device, reference may be made to a function-oriented architecture, in comparison with the controller-oriented architecture known from the prior art.

Also provided according to the present disclosure is a vehicle that has the control device disclosed here.

Also provided according to the present disclosure is a method for controlling an electromechanical system, the electromechanical system having at least one group of actuators, of which in each case one actuator can be coupled to a mechanical unit and is designed to control the operation of this mechanical unit, and having at least one group of functional modules, which are preferably implemented on a computing platform, comprising: a plurality of control modules, a control module being respectively assigned to an actuator and coupled to it in a communicative manner, and a coordinating module, which is communicatively coupled to the plurality of control modules. The method comprises: receiving fault messages with respect to the operation of the actuators and/or the mechanical units by the coordinating module, establishing a malfunction on the basis of the fault messages received, and initiating countermeasures in the form of a modification of the operation of at least one of the actuators from the group, in order to counteract the malfunction established. In principle, each of the control modules serves for controlling the operation of at least one associated actuator.

It goes without saying that the features mentioned above and those still to be explained below can be used not only in the combination that is respectively specified, but also in other combinations or on their own without departing from the scope of the present disclosure.

In FIG. 1, a construction given by way of example of a customary E/E architecture is illustrated. A first customary controller (or actuator) 1 and a second customary controller (or actuator) 2 are shown. Both controllers 1, 2 have the same basic construction. The first controller 1 has a control unit 10, an actuating unit 11, a fault handling unit 12 and also a fault monitoring unit 13. The fault handling unit 12 may have a DIM and/or an FIM. The second controller 2 likewise has a control unit 20, an actuating unit 21, a fault handling unit 22 and also a fault monitoring unit 23. The fault handling unit 22 may have a DIM and/or an FIM. The first controller 1 is coupled to a first mechanical system 15, for example a park position, and activates it. In the same way, the second controller 2 is coupled to a second mechanical system 25, for example an electrical parking brake, and likewise activates it. Reference sign 3 denotes a generic alert, which may for example correspond to a symbol on the instrument cluster or to a sound that is output.

When a mechanical system 15, 25 with the architecture outlined in FIG. 1 has a fault which is detected by the corresponding fault monitoring unit 13, 23, each controller 1, 2 may transmit a corresponding fault message to the instrument cluster, which usually leads directly to the output of the generic alert.

Figure 2:
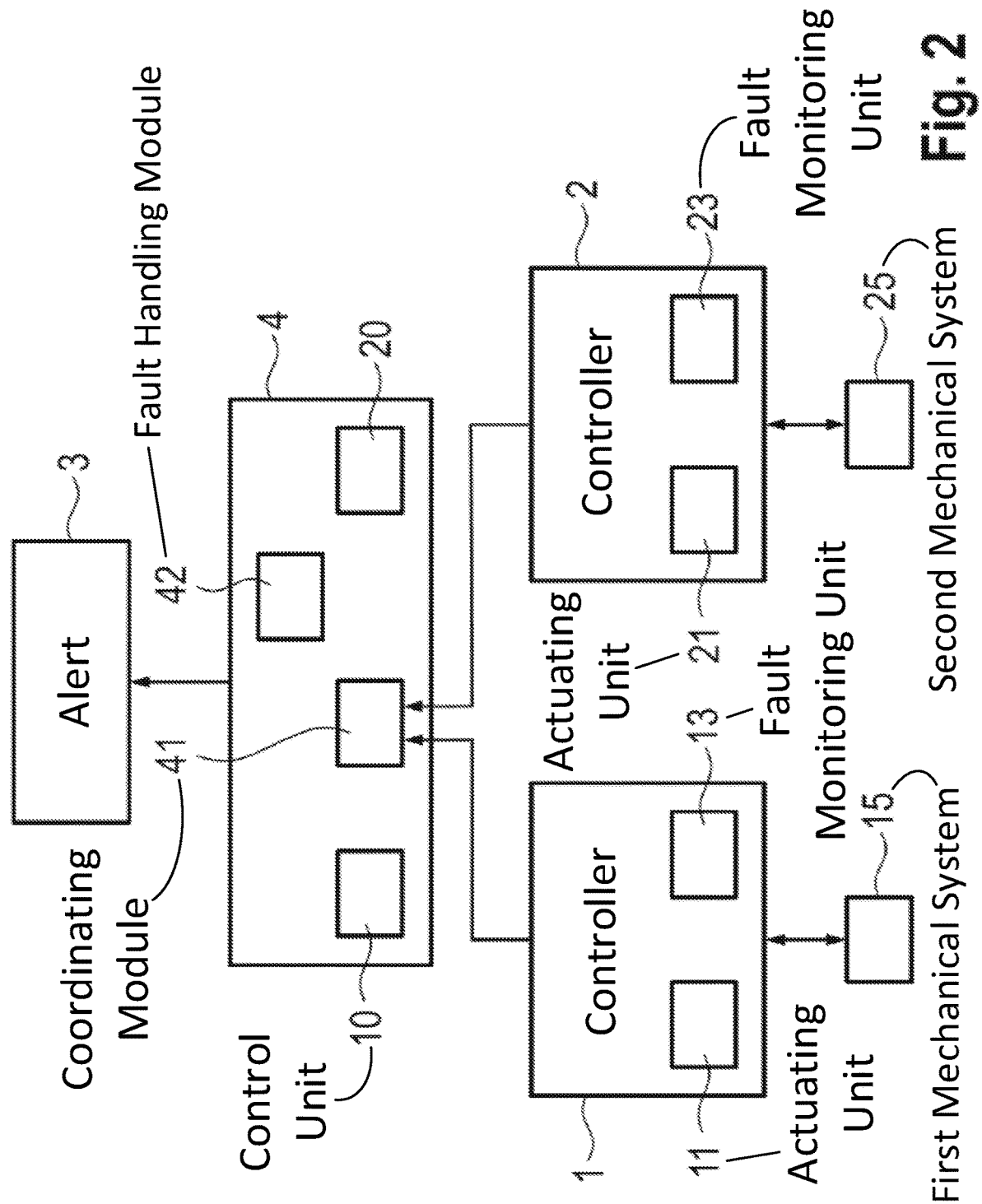
FIG. 2 shows a construction given by way of example of the architecture according to the present disclosure.

In comparison to this, in FIG. 2 a construction given by way of example of the architecture according to the present disclosure is illustrated. As shown, the control device is based on a new system level, which is arranged between the generic alert, for instance between the device responsible for the output of the alert 3, and the controllers 1, 2. The new system level represents a computing platform 4, on which in the example shown four functional modules are implemented. The functional modules arranged on the computing platform 4 at the same time form the at least one group of functional modules which is assigned to the at least one group of actuators that comprises the two controllers 1, 2. The functional modules comprise a first control module 10, which is responsible for the operation of the first controller 1, and a second control module 20, which is responsible for the operation of the second controller 2. The functional modules also comprise a coordinating module 41 and a fault handling module 42, the functions of which have already been previously described. As in the case of the exemplary embodiment shown in FIG. 1, each controller 1, 2 activates a corresponding mechanical system 15, 25.

The difference from the previously known E/E architecture illustrated in FIG. 1 is on the one hand that parts of the functional units comprising the actuators 1, 2 in the control device illustrated in FIG. 2 have been relocated to the computing platform 4, to be specific the control units 10, 20 and also the fault handling units 12, 22, the latter having been combined in FIG. 2 on the computing platform 4 to form a central fault handling module 42. Therefore, the two controllers 1, 2 in FIG. 2 have been adapted to the extent that in each case they only have the actuating unit 11, 21 and the fault monitoring unit 13, 23. On the other hand, a new central module is provided, the coordinating module 41, which collects all of the notified functional restrictions (represented by the arrows between the controllers 1, 2 and the coordinating module 41) of the components of the actuator/sensor level and decides on alternative measures to be taken, and in particular on items of information to be displayed.

FIG. 3 shows a further construction given by way of example of the architecture according to the present disclosure, which is based on the basic construction from FIG. 2. A first computing platform 4 and a further computing platform 5 are shown. Within the first computing platform 4, the control module 10 responsible for the first controller 1 is provided and also the coordinating module 41, the fault handling module 42 and an output module 43, the functions of which have likewise already been previously described. Although only one controller 1 is shown, it goes without saying that further controllers may be provided, respectively coupled to an associated control module. The functional modules within the second computing platform 5 are not explicitly shown, but may be assumed to be analogous to the functional modules within the first computing platform 4. The second computing platform 5 is coupled to an instrument cluster 51, which is activated by a corresponding control module, for example for the output of optical and/or acoustic alerts.

There follows an explanation of the functional principle of the architecture shown in FIG. 3. In a scenario given by way of example, the mechanical unit 15 may correspond to a park position, it then being possible for the first computing platform 4 to be responsible for controlling the power train. The arrows shown in FIG. 3 represent communications between the respective elements/components, single-headed and double-headed arrows indicating the direction of communication. A communication may for example correspond to the transmission of a signal or a series of signals.

The mechanical unit 15 is in principle activated by the actuating unit 11 on the basis of an external instruction, for example a driver's wish to select the park position, which is transmitted to the control module 10 by means of a first communication 61. In accordance with the external instruction, the control module 10 transmits a setpoint stipulation to the actuating unit 11 by means of a third communication 63. The actuating unit 11 correspondingly activates the mechanical system 15 and notifies the control module 10 of the actual state by means of a fourth communication 64. The control module 10 reports the status with regard to the execution of the external instruction received, by way of a second communication 62.

When the mechanical unit 15 has a fault, this is detected by the fault monitoring unit 13 and transmitted to the associated control module 10 by means of a fifth communication 65. After receiving a fault message, the control module 10 transmits a fault message to the coordinating module 41 by means of a sixth communication 66. The coordinating module 41, which has all of the relevant items of information concerning the entire vehicle, agrees with further units on a possible alternative measure to compensate for the existing fault, by means of a seventh communication 67. At the same time, a documentation of relevant items of information with regard to the existing fault and the resultant decision taken takes place in the fault handling module 42, by means of an eighth communication 68. At the same time, the coordinating module 41 determines which items of information are to be displayed on the output device 51. For this, first a fault information signal is transmitted to the output module 43, by means of a ninth communication 69. The fault information signal may for example have an item of information about the degree of the existing fault (for example fault stage 1—unrestricted continued driving possible; fault stage 2—restricted continued driving possible; fault stage 2a—restricted continued driving possible, output of an additional item of information; fault stage 3—continued driving not possible, no power transmission; fault stage 4—no continued driving, blocker). The output module 43 bundles the display wishes of the group of functional modules and also of the associated group of actuators, and performs a prioritization in this respect, if for example a display field can display a number of fault messages of which there is more than one. The alert to be displayed is transmitted by means of a tenth communication 70 from the output module 43 to the second computing platform 5, for example to the display device 51 by means of an eleventh communication 71, which comes from the associated controller (not explicitly shown in FIG. 3.

For time-critical fault messages, a direct time-critical communication path is provided between the controller 1 and the coordinating module 41. By means of this communication path, a time-critical monitoring function for complying with the requirements of functional safety to ISO standard 26262 can be accomplished by means of a twelfth communication 72. As a result, time-critical faults can be output directly, without having to go by way of the associated control module 10.

Reference sign 44 indicates those elements that embody the already mentioned advantageous system context—the mechanical unit 15, the associated controller 1 and also the associated control module 10. The control module 10 controls and monitors (regulates) the associated controller 1 and notifies the coordinating module 41 of functional restrictions. The clear system context makes variant formation easier.

As a modification of the representation in FIG. 3, instead of the ninth communication 69 between the coordinating module 41 and the output module 43, an equivalent communication may take place between the fault handling module 42 and the output module 43. In other words, the fault handling module 42 may be designed to transmit to the output module 43 a fault information signal on the basis of the items of information from the coordinating module 41 for the documentation of the existing malfunction and the alternative measure performed and the information output possibly to be performed to the driver.

The communications between the controller 1 and the first computing platform 4 or the functional modules implemented therein may take place for example by way of FlexRay or CAN. In the example shown in FIG. 3, further controllers may be provided, for example for controlling components from the area of the engine and the transmission, which by analogy with the first controller 1 are communicatively coupled to the functional modules of the first computing platform 4. The communication between the first computing platform 4 (for example first HCP) and the second computing platform 5 (for example second HCP) may be handled by a different fieldbus, for example by Ethernet. For the communication between the output device 51 and the second computing platform 5, expediently CAN FD (CAN protocol with flexible data rate) or LVDS (low-voltage differential signaling—interface standard for high-speed data transmission) may be used.

In particular when using the control device in a vehicle, a computing platform being responsible for controlling the power train, maximum availability of the power train when there is a fault can be achieved by initiating countermeasures that are taken on the basis of the state of the overall system. In this way, all possible alternative strategies can be realized and are manageable. Furthermore, the display of fault messages can undergo a plausibility check or verification. If for example it happens that the park position has not been selectable on five occasions, and instead use of the electronic parking brake has been requested, only then can a corresponding warning alert be displayed to the driver.

A further advantage of the control device can be seen in the fact that variant management is facilitated across all brands and model ranges. By locating the coordinating module (in particular the PTR manager) in the HCP, all of the relevant vehicle variants can be replicated without any great effort. This is likewise helped by the centralization of the processing of all of the drive-related restrictions in one module.

Yet a further advantage of the control device can be seen in the fact that an updating of the strategy of measures is possible relatively easily, to be precise across all model ranges and brands. Thus, for example, new alternative strategies (for example compensating for a fault in the automated shift transmission by existing electric motors) can be specifically introduced or adapted.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A control device for an electromechanical system, the control device comprising:
    at least one group of actuators, of which in each case one actuator is configured to be coupled to a mechanical and/or hydraulic unit and is configured to control an operation of the mechanical and/or hydraulic unit;
    at least one group of functional modules, which are implemented on at least one computing platform, the at least one group of functional modules comprising:
    a plurality of control modules, each respective control module being respectively assigned to and coupled in a communicative manner to a respective actuator; and
    a coordinating module communicatively coupled to the plurality of control modules, the coordinating module being designed to:
    i) receive, from each respective control module of the plurality of control modules, fault messages with respect to an operating state of the associated mechanical and/or hydraulic unit and/or the associated actuator; and
    ii) establish a malfunction based on the fault messages received, and in response, counteract the malfunction established by a countermeasure in the form of a modification of the operation of at least one of the actuators from the at least one group.

2. The control device as claimed in claim 1, wherein the coordinating module is further configured to output a fault information signal in dependence on the malfunction established and/or the countermeasure taken.

3. The control device as claimed in claim 2, wherein the at least one group of functional modules is communicatively coupled to a second group of functional modules.

4. The control device as claimed in claim 3, wherein the control module that activates the output device is configured to output an item of fault information on the basis of the fault information signal via the output device.

5. The control device as claimed in claim 1, further comprising an output device, which is activated by a control module of a second group of functional modules.

6. The control device as claimed in claim 1, wherein each actuator has a fault monitoring unit configured to transmit a corresponding fault signal or information about functional restrictions to the associated control module when there is an operating error of the mechanical unit.

7. The control device as claimed in claim 1, wherein the at least one group of functional modules further comprises:
    a diagnosis event module communicatively coupled to the coordinating module and having a fault memory; and
    a function suppression module communicatively coupled to the coordinating module and is configured to prevent performance of certain functions of the electromechanical system in dependence on a current state of the electromechanical system.

8. The control device as claimed in claim 1, wherein the at least one group of functional modules further comprises:
    an output module communicatively coupled to the coordinating module and designed to receive the fault information signal and perform a prioritization and/or coordination with regard to the items of information to be output on the basis of the fault information signal.

9. The control device as claimed in claim 1, the electromechanical system being a platform for constructing an automobile.

10. A vehicle, having the control device as claimed in claim 1.

11. A method for controlling an electromechanical system, the electromechanical system having at least one group of actuators, of which in each case one actuator is configured to be coupled to a mechanical unit and is designed to control an operation of the mechanical unit, and further having at least one group of functional modules, which are implemented on at least one computing platform, the at least one group of functional modules comprising a plurality of control modules, each control module being respectively assigned to an actuator and coupled to it in a communicative manner, and a coordinating module communicatively coupled to the plurality of control modules, the method comprising:
    receiving fault messages and/or functional restrictions with respect to the operation of the actuators and/or the mechanical and/or hydraulic units by the coordinating module;
    establishing a malfunction based on the fault messages received; and
    initiating countermeasures in the form of a modification of the operation of at least one of the actuators from the at least one group, in order to counteract the malfunction established.

* * * * *